US006728740B2

(12) United States Patent
Kelly et al.

(10) Patent No.: US 6,728,740 B2
(45) Date of Patent: *Apr. 27, 2004

(54) RANDOM NUMBER GENERATOR SEEDING METHOD AND APPARATUS

(75) Inventors: John R. Kelly, San Jose, CA (US); Bruce McLoughlin, Santa Clara, CA (US)

(73) Assignee: IGT, Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/292,183

(22) Filed: Nov. 12, 2002

(65) Prior Publication Data

US 2003/0069910 A1 Apr. 10, 2003

Related U.S. Application Data

(63) Continuation of application No. 09/396,135, filed on Sep. 14, 1999, now Pat. No. 6,502,116.
(60) Provisional application No. 60/100,170, filed on Sep. 14, 1998.

(51) Int. Cl.[7] ................................................ G06F 1/02
(52) U.S. Cl. ........................................ 708/250; 708/254
(58) Field of Search ............................... 708/250, 251, 708/252, 253, 254, 255, 256; 463/16

(56) References Cited

U.S. PATENT DOCUMENTS

| 4,277,064 A | 7/1981 | Newman |
| 4,694,412 A | 9/1987 | Domenik et al. |
| 4,713,787 A | 12/1987 | Rapp |
| 5,251,165 A | 10/1993 | James, III |
| 5,383,143 A | 1/1995 | Crouch et al. |
| 5,463,689 A | 10/1995 | Schutte et al. |
| 5,779,545 A | 7/1998 | Berg et al. |
| 5,871,400 A | 2/1999 | Yfantis |
| 6,502,116 B1 * | 12/2002 | Kelly et al. ................. 708/250 |

FOREIGN PATENT DOCUMENTS

| EP | 0 388 131 | 9/1990 |
| GB | 1 515 282 | 6/1978 |

OTHER PUBLICATIONS

European Search Report dated Jul. 24, 2002.
Francis, N.D., "Generation of Random Numbers on Micros—A Simulation Study," Microprocessing and Microprogramming, Elsevier Science Publishers, vol. 15, No. 1, 1995, pp. 17–19.

* cited by examiner

Primary Examiner—Chuong Dinh Ngo
(74) Attorney, Agent, or Firm—Marshall, Gerstein & Borun LLP

(57) ABSTRACT

A random number generator seeding method and apparatus which includes the provision of an RNG seed register and means for capturing a current count number from one or more fast running counters contained within the apparatus upon the occurrence of an act or acts by an apparatus operator as he performs the normal set-up and initialization function. In the preferred embodiment means are provided for sensing particular acts of the operator, and upon detection of each such "event", one or more of the counters within the system are read and the count value is appended to previously captured counter values until the desired seed length is obtained. At this time, the RNG is said to be seeded, the initialization phase is completed and the apparatus may be made available to players to commence game play or other use of the apparatus.

8 Claims, 3 Drawing Sheets

RANDOM NUMBER GENERATOR SEEDING METHOD AND APPARATUS

RELATED APPLICATIONS

This is a continuation of U.S. Ser. No. 09/396,135 filed Sep. 14, 1999, now U.S. Pat. No. 6,502,116 which claims the benefit of U.S. Provisional Application No. 60/100,170 filed Sep. 14, 1998. Both of the applications identified in this paragraph are incorporated by reference herein in there entirety.

BACKGROUND OF THE INVENTION

1. Field of the Invention

The present invention relates generally to random number generator methods and apparatus, and more particularly to an improved method and apparatus for randomly seeding a random-numbered generator.

2. Background of the Invention

In many types of devices, random number generators (RNGs) are used to generate numbers that are used for certain computational purposes, and it is usually important that the starting number or "Seed Value" be truly random because it is this seed value that will determine the sequence of numbers that the RNG will ultimately produce. In one type of application, RNG devices are used in various types of gaming machines including for example, slot machines and similar gambling apparatus, to produce the numbers used to drive the apparatus. See for example, Yfantis, U.S. Pat. No. 5,871,400, issued Feb. 16, 1999, and entitled "Random Number Generator For Electronic Applications", expressly incorporated hereinto by reference. Because each machine must operate totally independently of every other machine, the seed value of each machine must be different from that of the others because the seed value will ultimately determine the sequence of numbers that the RNG will produce to drive the game. If two slot machines with the same RNG algorithm are seeded with the same seed value, both machines will produce the same sequence of numbers. This is not permissible because slot machines must include as much randomness as is possible in order to make them "fair" and unpredictable. It is therefore desirable that the RNG seeds for each machine be unknown, unpredictable and different from one machine to another.

Before a gaming device such as a slot machine can be put in service, the machine must be initialized. In the usual case, the slot machine goes through at least three phases during initialization; namely, set-up, seeding and finally, the seeded phase, and it is not until the seeded state is reached that a player will be able to use the machine in a normal course of play. The set-up phase is simply a power-on and initialization phase where RAM tests are performed and the various software and hardware modules are initialized. During the seeding phase, a random number is input to the machine, and once loaded, the apparatus is said to be seeded and play can commence in the prior art various technologies have been used to select a seed value but such value was generated in a way that permitted inspection and the possibility of tampering. There is therefore a need for a method and apparatus that will permit the generation of a seed value that is totally random, unpredictable, and always different from one machine to another.

SUMMARY OF THE INVENTION

An object of the present invention is to provide a novel method and apparatus for generating the seed number to be used in a random number generator.

Another object of the present invention is to provide a method and apparatus for randomly generating and loading a seed number into a register within the random number generator.

Still another object of the present invention is to provide a method and apparatus by which a seed can be randomly generated and loaded into the seed register of an RNG during set-up of the gaming or other apparatus incorporating an RNG.

Briefly, a preferred embodiment of the present invention includes the provision of an RNG seed register and means for capturing a current count number from one or more fast running counters contained within the apparatus upon the occurrence of an act or acts by an apparatus operator as he performs the normal set-up and initialization function. In the preferred embodiment means are provided for sensing particular acts of the operator, and upon detection of each such "event", one or more of the counters within the system are read and the count value is appended to previously captured counter values until the desired seed length is obtained. At this time, the RNG is said to be seeded, the initialization phase is completed and the apparatus may be made available to players to commence game play or other use of the apparatus.

An important advantage of the present invention is that it uses a random sequence and timing of events to obtain a plurality of unknown count values which when captured in sufficient quantity, will constitute a seed number which is totally unknown, unpredictable and different from one machine to another.

Another advantage of the present invention is that it creates a seeding operation in which it is virtually impossible for the operator to influence the seeding process in a predictable way to obtain a predictable seed number.

These and other objects of the present invention will no doubt become apparent to those skilled in the art after having read the following detailed description of preferred embodiments.

IN THE DRAWINGS

DETAILED DESCRIPTION OF THE PREFERRED EMBODIMENTS

Figure 1:
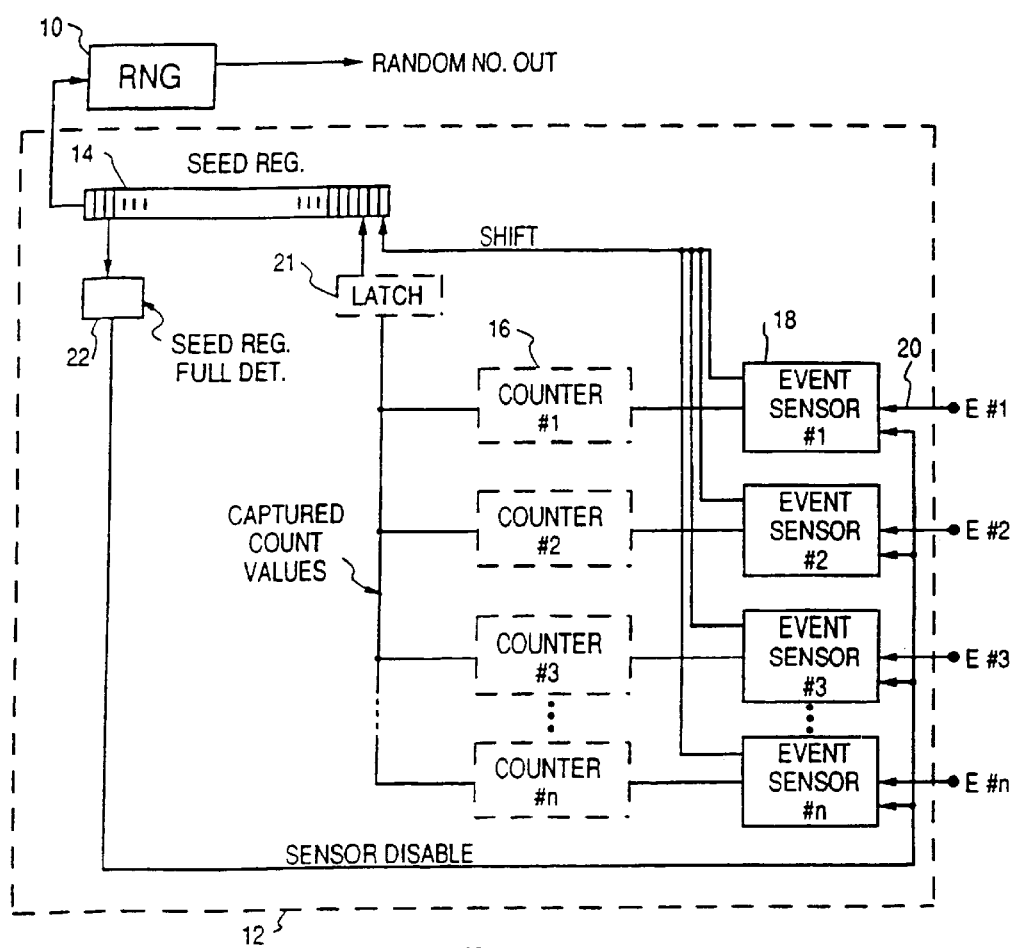
FIG. 1 is a block diagram schematically illustrating a first alternative embodiment to the present invention.

Referring now to FIG. 1 of the drawing, a first embodiment of a seeding apparatus for an RNG 10 is illustrated at 12 and may be schematically represented as including a seed register in the form of a shift register 14 which loads from the right and shifts left as depicted. Operatively coupled to the input end of register 14 are one or more fast running counters 16 designated 1 through N. These counters are typically not dedicated to the apparatus forming the preferred embodiment of this invention (and are thus shown in dashed lines in FIGS. 1 and 2) but are counters used for other purposes in a system including and/or using the RNG 10. It is the ephemeral count per se captured from the counter(s) at one or more particular times ("event times"), that forms an element of the invention. Coupled to each counter 16 is an event sensor 18 which upon sensing the occurrence of an event, as indicated by the input at 20, generates an event signal that causes the current count value of the associated counter to be captured and loaded into register 14, either directly or through an appropriate detecting and latching arrangement (shown in dashed lines at 21). Sensor 18 may also generate a shift signal for causing register 14 to be shifted a number of places corresponding to the number of count value bits input by the corresponding counter 16.

If a single counter and sensor combination are utilized, the captured output of counter number 1 will be sequentially input to register 14 each time event sensor member 1 senses the occurrence of an event (at an "event time") and such action will repeat until a predetermined number of events have been sensed, at which time it is determined that the seed register 14 is full. Alternatively, a seed register full detector 22 may be used to generate a sensor disable signal for disabling sensor number 1. Depending upon the type of RNG utilized, register 14 may offload the entire seed to the RNG, and be zeroed out, or it may form part of several registers or a circulating loop such that the seed continuously circulates through the RNG 10 as part of the random number generating function. At this time, the RNG 10 is said to be seeded and is ready to commence generation of random numbers at its output 24.

Figure 2:
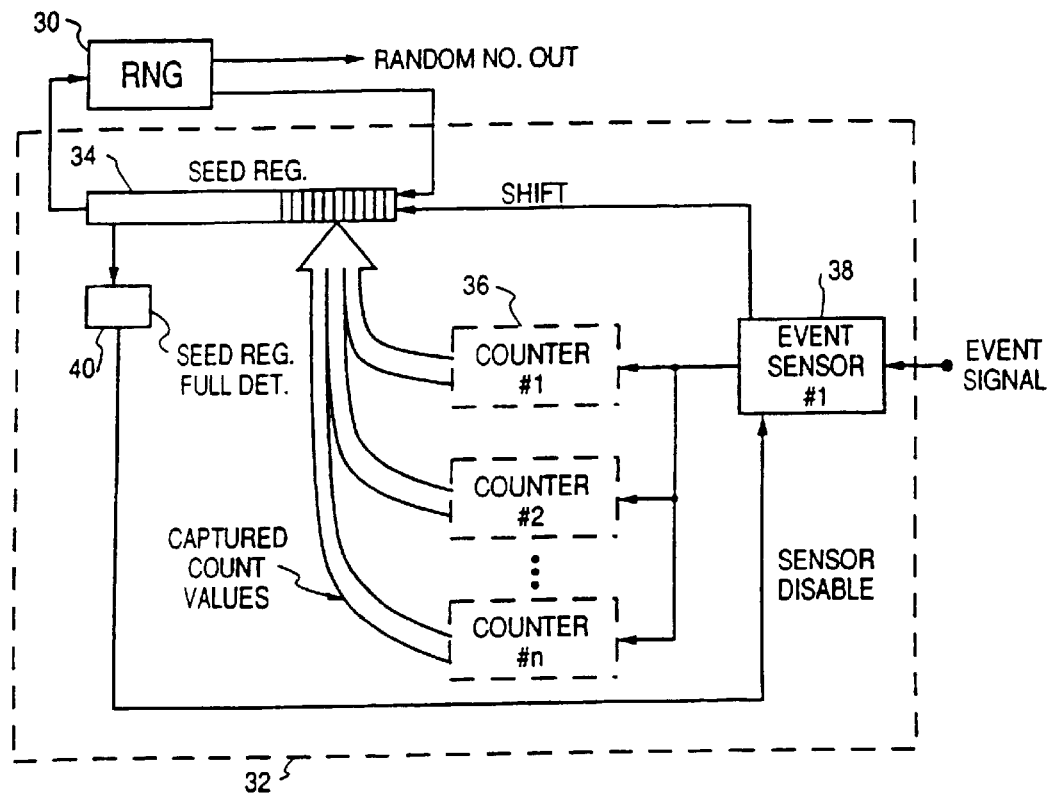
FIG. 2 is a block diagram schematically illustrating an alternative embodiment to the present invention.

In FIG. 2, an alternative embodiment is depicted including an RNG 30, and an associated seed generating circuit is shown in schematic form at 32. As in the previously described embodiment, a register 34 is provided together with a plurality of counters 1-N, as shown at 36, the outputs of which are ganged together so as to simultaneously load the several captured count values in parallel to an input end of register 34 upon the sensing of a particular event by a single event sensor 38. Sensor 38 may also generate a shift command causing the new input to be shifted through the register, and thereby by appended to any previous inputs. The captured count values will be continually shifted through the register 34 each time an event is sensed until either a predetermined number of such events occur, or a seed register full detector 40 indicates a completed seed and perhaps generates a disable signal for disabling event sensor 38. At this time, seed register 34 contains the full seed and is ready to "seed the RNG" 30.

As alternatives to the two above-described implementations, it should be noted that sequential outputs of a single sensor may, on the occurrence of events, be stepped through a plurality of counters to capture and extract the required count values, or the outputs of a plurality of sensors may be similarly applied in order to a single counter upon the occurrence of a series of events to obtain the required count values at the times of occurrences of the events.

Figure 3:
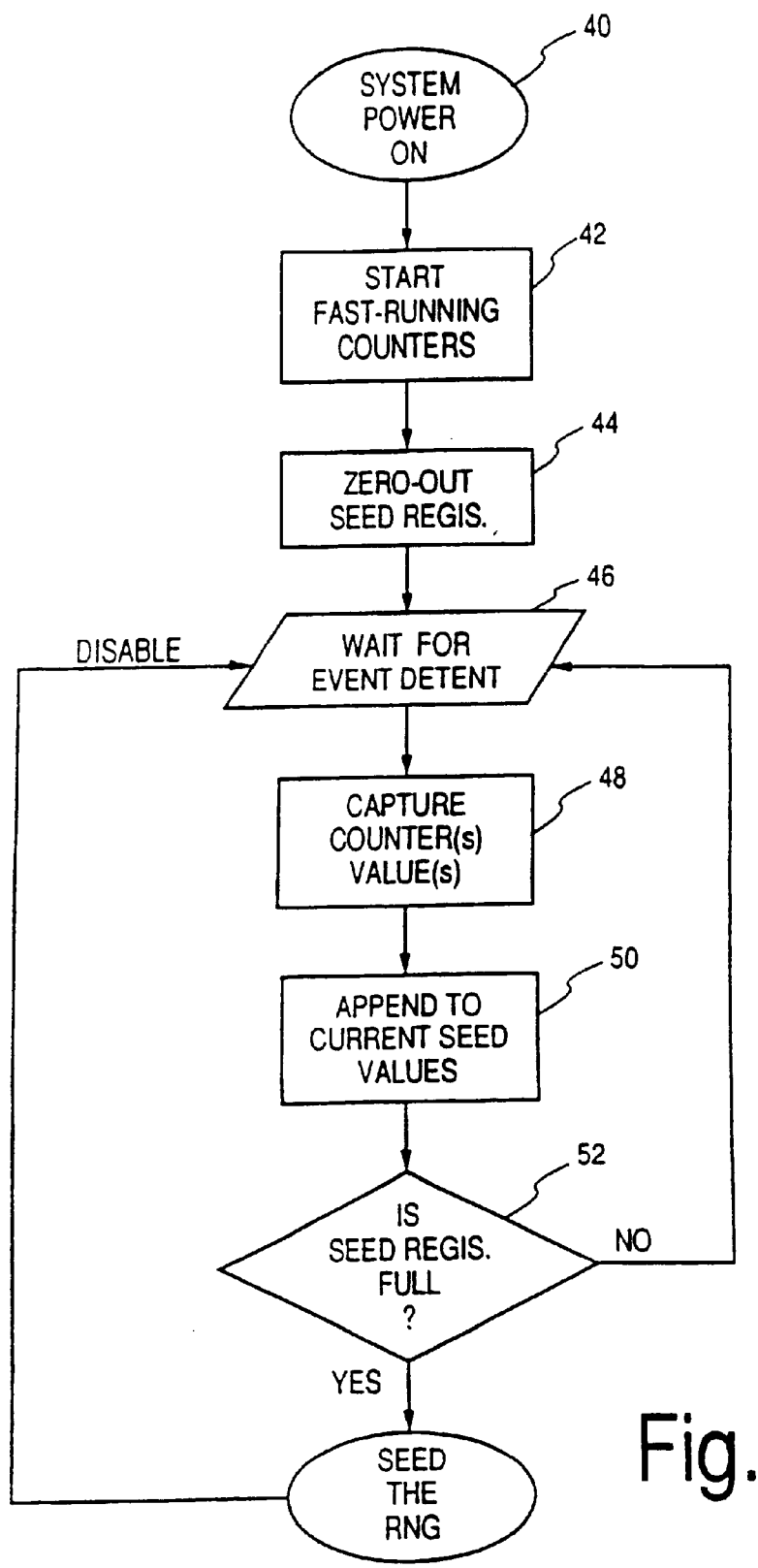
FIG. 3 is a flow diagram illustrating the operational sequence of the embodiments illustrated in FIGS. 1 and 2.

Referring now to FIG. 3, a flow diagram is presented in which operation of the above embodiments are generally illustrated in logical operation format. As indicated at block 40, the first step is to turn the system power ON and commence initialization of the system. As suggested by box 42, the power ON operation causes one or more fast running counters to begin counting. As indicated at 44, any current seed value is zeroed out on power up and the system awaits the detection of an operator event as evidenced by b-lock 46. An "operator event" might be the depression of buttons by the operator, the opening of doors, hits applied to a touch screen, etc., or any other predetermined operator action. Upon the occurrence of the event or events, the current count values of the one or more counters are captured (Block 48). Such value(s) are then appended to any current seed values (values previously captured and collected) as indicated at 50. At this point, the seed is tested to determine whether or not there is a predetermined number of bits in the seed, and if not, the system awaits a subsequent user event and the operation is repeated. However, if the test at 52 indicates that enough bits have been loaded into the seed, the operation will be deemed complete and the RNG will be seeded. At this time the event sensor at step 46 may be disabled and the system made ready for use.

In an actual system, the RNG seed might for example, be a number within the range of 600–700 bits. As indicated above, this number is constructed over time using predetermined but "randomly occurring" events that are caused to occur as a result of normal actions taken by a system operator during system initialization. As suggested above, when a particular input event is detected, one or more fast running counters are read. By "fast running" it is meant that the counters are counting at rates fast enough that the operator would have no way of determining what the current count value is at any particular time (e.g. the counters may generate bits in nanosecond units). As the count values are captured, the values are appended to previously counted count values until the desired seed length is obtained. In the particular seeding implementation described, upon each event sensed, the current counts of counters collecting the following statistics are read.

| Counter No. 1 | Time Stamp Count (Total Clocks) | 27 bits |
|---|---|---|
| Counter No. 2 | Instructions Executed | 25 bits |
| Counter No. 3 | Date of Reads and Writes | 24 bits |
| Counter No. 4 | pSOS Microsecond Timer (Time_Get) | 20 bits |
| | | 96 bits |

Note that it will take 7 calls to this function to accumulate enough bits to seed a 607-bit FCG and the two 32 bit Marsaglia seeds (total 671 bits) used in this particular system.

Although the present invention has been described above in schematic form, and in terms of several alternative schematic implementations, it will be appreciated that these illustrations are not intended to be exhaustive, and are merely representative and intended to teach one skilled in the art how to implement the invention using his own implementational skills. Moreover, the diagrams are intended to be simple in form and may or may not represent actual implementations of a real system on a one-to-one component basis.

The essence of the invention is that a seed for an RNG mechanism (implemented in hardware, firmware or software) is generated by capturing one or more current count values, typically in digital form, from one or more fast running counters in response to the occurrence of one or more operator acts or caused events. The respective captured values constitute random numbers which when concatenated or otherwise combined, form a larger or different random number for use as a seed. Note that although the captured count values are described above as being shifted into a register, they could alternatively serve as mathematical multipliers or other functions which when used to manipulate other captured or generated values, will yield random numbers of increased complexity. The term "Operator" is used herein to generally represent any human or robotic manipulator that is manipulating system components operating in a non-synchronized relationship to the event counters, or otherwise creating an effect upon or within the apparatus that can be sensed as the occurrence of any event. The term "counter" is intended to include any device or means that changes with time and from which a time related signal can be captured and converted to some type of informational data bits. Examples of such counters might include mechanical or electronic clocks, shaft encoders, timing lights, moving electromagnetic flags, etc., and any sensory detectors associated therewith.

It is therefore intended that the following claims be interpreted broadly so as to cover the full spirit and scope of the invention.

What is claimed is:

1. An apparatus for seeding a random number generator, comprising:
    a random number generator;
    a shift register coupled to the random number generator;
    a counter coupled to the shift register, wherein the counter generates a count signal;
    an event sensor coupled to the counter, wherein the event sensor, upon detecting an event, causes the count signal to be transferred from the counter to the shift register and causes contents of the shift register to be shifted; and
    a shift register full detector coupled to the shift register and that detects when the shift register is full, wherein the shift register full detector causes at least some of the contents of the shift register to be transferred to the random number generator when the shift register full detector determines that the shift register is full, thereby seeding the random number generator with the contents of the shift register.

2. The apparatus as recited in claim 1, further comprising a plurality of event sensors, each coupled to the counter, wherein each event sensor, upon detecting an event, causes the count signal to be transferred from the counter to the shift register and causes the contents of the shift register to be shifted.

3. The apparatus as recited in claim 1, further comprising a plurality of counters coupled to the shift register, each counter generating a corresponding count signal; and
    a plurality of event sensors, each coupled to a corresponding counter, wherein each event sensor, upon detecting an event, causes the corresponding count signal to be transferred from the corresponding counter to the shift register and causes the contents of the shift register to be shifted.

4. The apparatus as recited in claim 1, further comprising a device for determining when a predetermined number of count value bits have been transferred to the shift register.

5. The apparatus as recited in claim 4, wherein the device for determining when a predetermined number of count value bits have been transferred to the shift register also disables the additional transfer of signals into the shift register.

6. A method for seeding a random number generator, comprising:
    generating a plurality of count values by a plurality of counters;
    sensing an event through a sensor and generating a corresponding event signal;
    capturing simultaneously in a seed register the plurality of count values from the plurality of counters in response to the event signal;
    concatenating and appending the captured plurality of count values to previously captured count values in response to the event signal;
    detecting through a seed register full detector when the seed register is full;
    transferring at least some of the contents of the seed register to the random number generator; and
    seeding the random number generator with the contents of the seed register.

7. The method of claim 6, further comprising determining when a predetermined number of count value bits have been transferred to the seed register.

8. The method of claim 7, further comprising disabling the additional transfer of signals into the seed register when a predetermine number of count value bits have been transferred to the seed register.

* * * * *